United States Patent
Mennig

(10) Patent No.: US 9,645,433 B2
(45) Date of Patent: May 9, 2017

(54) GLAZING HAVING ELECTRICALLY SWITCHABLE OPTICAL PROPERTIES

(71) Applicant: SAINT-GOBAIN GLASS FRANCE, Courbevoie (FR)

(72) Inventor: Julius Mennig, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/649,534

(22) PCT Filed: Nov. 12, 2013

(86) PCT No.: PCT/EP2013/073575
§ 371 (c)(1),
(2) Date: Jun. 3, 2015

(87) PCT Pub. No.: WO2014/086555
PCT Pub. Date: Jun. 12, 2014

(65) Prior Publication Data
US 2015/0301367 A1    Oct. 22, 2015

(30) Foreign Application Priority Data
Dec. 6, 2012  (EP) ..................................... 12195799

(51) Int. Cl.
*G02F 1/07* (2006.01)
*G02F 1/1335* (2006.01)
(Continued)

(52) U.S. Cl.
CPC ...... *G02F 1/1335* (2013.01); *B32B 17/10036* (2013.01); *B32B 17/10504* (2013.01);
(Continued)

(58) Field of Classification Search
CPC ........ G02B 17/10669; G02B 17/10761; G02B 17/10036; G02B 17/10504;
(Continued)

(56) References Cited

U.S. PATENT DOCUMENTS 6,056,861 A    5/2000  Fuhr et al.
6,178,034 B1 *  1/2001  Allemand ............. G02F 1/1521
                                                      359/265
(Continued)

FOREIGN PATENT DOCUMENTS

DE    102008026339 A1    12/2009
DE    102009044181 A1    4/2011
(Continued)

OTHER PUBLICATIONS

PCT Written Opinion mailed on Feb. 6, 2014 for PCT/EP2013/073575 filed on Nov. 12, 2013 in the name of Saint-Gobain Glass France (English + German).
(Continued)

*Primary Examiner* — Tuyen Tra
(74) *Attorney, Agent, or Firm* — Steinfl + Bruno LLP

(57) ABSTRACT

A glazing having electrically adjustable optical properties is described, including an outer pane and an optically adjustable element which is connected to the outer pane in a planar fashion via at least one thermoplastic film, wherein the thermoplastic film contains at least one luminescent material.

26 Claims, 4 Drawing Sheets

Figure 1:
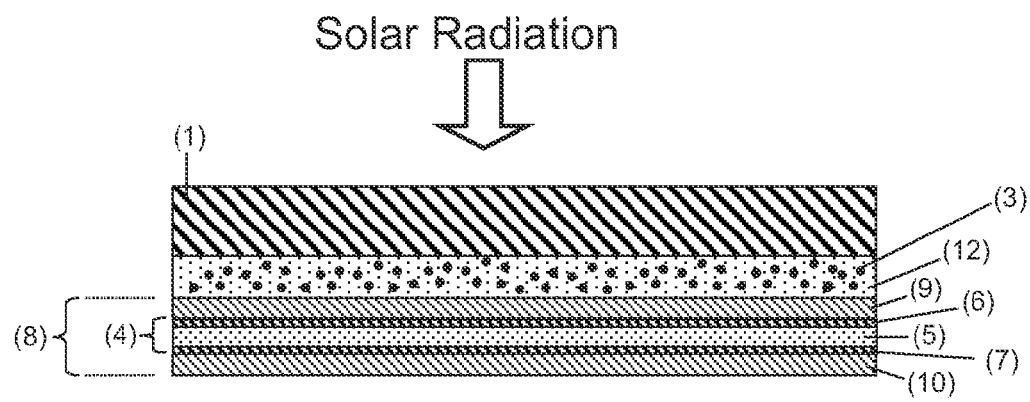

(51) Int. Cl.
  *B32B 17/10* (2006.01)
  *C09K 11/02* (2006.01)
  *C09K 11/06* (2006.01)
  *G02F 1/1334* (2006.01)
  *G02F 1/157* (2006.01)
  *G02F 1/17* (2006.01)

(52) U.S. Cl.
  CPC .. *B32B 17/10532* (2013.01); *B32B 17/10669* (2013.01); *B32B 17/10761* (2013.01); *B32B 17/10788* (2013.01); *C09K 11/02* (2013.01); *C09K 11/06* (2013.01); *G02F 1/1334* (2013.01); *G02F 1/157* (2013.01); *G02F 1/17* (2013.01); *G02F 1/172* (2013.01); *C09K 2211/1007* (2013.01)

(58) Field of Classification Search
  CPC ........ G02B 17/10532; G02B 17/10788; B32B 17/10; B32B 2367/00
  USPC ....... 359/265–275; 345/105; 264/21; 349/84
  See application file for complete search history.

(56) References Cited

U.S. PATENT DOCUMENTS

| | | |
|---|---|---|
| 2004/0227462 A1 | 11/2004 | Utsumi et al. |
| 2009/0176101 A1 | 7/2009 | Greenall et al. |
| 2010/0294366 A1 | 11/2010 | Kanesato et al. |
| 2012/0026573 A1 | 2/2012 | Collins et al. |
| 2013/0050983 A1 | 2/2013 | Labrot et al. |
| 2013/0252001 A1 | 9/2013 | Sablayrolles et al. |

FOREIGN PATENT DOCUMENTS

| | | |
|---|---|---|
| EP | 0876608 B1 | 4/2002 |
| JP | 2009534283 A | 9/2009 |
| WO | 9720210 A1 | 6/1997 |
| WO | 1862849 A1 | 12/2007 |
| WO | 2010112789 A2 | 10/2010 |
| WO | 2010147494 A1 | 12/2010 |
| WO | 2011033313 A1 | 3/2011 |
| WO | 2011036010 A1 | 3/2011 |
| WO | 2012007334 A1 | 1/2012 |
| WO | 2012010444 A1 | 1/2012 |
| WO | 2012072950 A1 | 6/2012 |
| WO | 2012154663 A1 | 11/2012 |

OTHER PUBLICATIONS

PCT International Search Report mailed on Feb. 6, 2014 for PCT/EP2013/073575 filed on Nov. 12, 2013 in the name of Saint-Gobain Glass France.

* cited by examiner

GLAZING HAVING ELECTRICALLY SWITCHABLE OPTICAL PROPERTIES

CROSS REFERENCE TO RELATED APPLICATIONS

The present application is the U.S. national stage of International Patent Application PCT/EP20013/073575 filed internationally on Nov. 12, 2013 which, in turn, claims priority to European Patent Application No. 12195799.7 filed on Dec. 6, 2012.

The invention relates to a glazing having electrically switchable optical properties, a method for its production, and the use of a thermoplastic film having a luminescent material in such a glazing.

Glazings, in particular composite panes, having electrically switchable functional elements are known. The optical properties of the functional elements can be changed by an applied voltage. Electrochromic functional elements, which are known, for example, from US 20120026573 A1 and WO 2012007334 A1, are an example of this. SPD functional elements (suspended particle device), which are known, for example, from EP 0876608 B1 and WO 2011033313 A1, are another example. The transmittance of visible light through electrochromic or SPD functional elements can be controlled by the voltage applied. Glazing having such functional elements can thus be conveniently darkened electrically.

Many switchable functional elements have limited long-term stability. This is true in particular for functional elements in glazings outdoors, for example, in building facades or in the motor vehicle sector, where the functional elements are exposed to solar radiation. The ultraviolet portion of the spectrum as well as the short wavelength portion of the visible range of solar radiation, in particular radiation with a wavelength less than roughly 410 nm, result in aging of the functional elements. The aging can be expressed, for example, in unaesthetic discoloration or color change of the functional elements, which can be homogeneous or even inhomogeneous. The aging can, however, also result in a degradation of the functionality of the switchable functional element, in particular in a reduced contrast between the switching states.

One obvious option for protecting the switchable functional element against UV radiation and short wavelength visible radiation consists in the incorporation of a UV blocker or a UV absorber into the glazing, for example, as a coating or incorporated into a polymer film. Such a solution is known, for example, from WO 2012/154663 A1. UV blockers filter the ultraviolet radiation as well as radiation of the short wavelength visible range out of solar radiation. Thus, the functional element is, to be sure, protected against aging; however, a clear color change of the light passing through the glazing to yellow is produced. Such a color change is unaesthetic and is, in particular, typically not accepted by automobile manufacturers. In addition, such UV blockers reduce the transmittance of visible light through the glazing.

The object of the present invention is to provide a glazing having electrically switchable optical properties that has protection of the switchable functional element against radiation in the UV range and in the short wavelength visible range. The glazing should have high transmittance in the visible spectral range and a low color change of the light passing through it.

The object of the present invention is accomplished according to the invention by a glazing having electrically switchable optical properties in accordance with independent claim 1. Preferred embodiments emerge from the subclaims.

The pane according to the invention having electrically switchable optical properties comprises at least the following characteristics:
 a outer pane and
 a switchable functional element, which is areally bonded to the outer pane via at least one thermoplastic film,
wherein the thermoplastic film contains at least one luminescent material.

The pane according to the invention (or pane arrangement) is preferably intended, in an opening, for example, of a motor vehicle or of a building, to separate the interior from the external environment. In the context of the invention, the outer pane faces, in the installed position, the external environment. The switchable functional element is arranged on the interior side of the outer pane. This means that the outer pane is arranged between the external environment and the switchable functional element. In principle, the glazing according to the invention can, of course, also be used in the interior of a building, in particular when protection against UV radiation is necessary there. The outer pane is then arranged between the UV radiation source and the functional element.

In the context of the invention, the term "a glazing having electrically switchable optical properties" refers not only to a glazing whose optical properties, for example, the transmittance of visible light, can be switched between two discrete states, for example, an opaque state and a transparent state. It also includes those glazings whose optical properties are continuously adjustable.

The pane according to the invention includes at least one thermoplastic film, which contains at least one luminescent material. The thermoplastic film with the luminescent material is, according to the invention, areally arranged at least between the outer pane and the switchable functional element. The thermoplastic film can include other regions that are not arranged between the outer pane and the functional element. The thermoplastic film can, for example, protrude beyond the functional element.

Sunlight passing through the glazing from the external environment thus first strikes the thermoplastic film with the luminescent material and then the functional element. Typical thermoplastic films are not transparent to ultraviolet radiation below a specific threshold wavelength, which depends on the thermoplastic material. Consequently, this part of the UV portion of solar radiation does not strike the functional element and cannot lead to aging. The UV radiation above the threshold wavelength as well as short wavelength portions of the visible spectral range are absorbed by the luminescent material and, consequently, can likewise not lead to aging of the functional element (or can do so only to a significantly reduced extent). In the context of the invention, the term "short wavelength portions of the visible range" means, in particular, radiation less than or equal to 410 nm. It has been found that protection of the functional element against radiation, in particular in the wavelength range from 380 nm to 410 nm leads to significantly reduced aging of the functional element.

In contrast to conventional UV blockers, the radiation energy is, however, not simply filtered out of the solar radiation. Instead, the luminescent material gives part of the radiation energy back off as luminescent radiation that has a greater wavelength than the absorbed radiation. Compared to conventional UV blockers, for one thing, less color change of the light passing through the glazing is obtained.

For another, higher transmittance of visible light is obtained. These are major advantages of the present invention.

The electrically switchable functional element includes at least one active layer, which has the switchable optical properties. The active layer is arranged areally between an outer and an inner transparent flat electrode. The outer flat electrode faces the outer pane and the inner flat electrode faces away from the outer pane. The flat electrodes and the active layer are typically arranged parallel to the surfaces of the outer pane. The flat electrodes are electrically connected to an external power source in a manner known per se. The electrical contacting is realized by suitable connection cables, for example, foil conductors, which are, optionally, connected to the flat electrodes via so-called busbars, for example, strips of an electrically conductive material or electrically conductive prints.

The switchable functional element, preferably the active layer of the switchable functional element, contains, in an advantageous embodiment of the invention, at least one organic material, for example, an organic matrix. Such active layers are particularly susceptible to aging from UV radiation. By means of the thermoplastic film according to the invention with the luminescent material, such functional elements are particularly effectively protected against aging.

The thermoplastic film according to the invention contains at least one thermoplastic polymer, preferably ethylene vinyl acetate (EVA) and/or polyvinyl butyral (PVB), particularly preferably polyvinyl butyral. Such thermoplastic films have low transparency in the UV range and are well suited for the incorporation of luminescent materials. The thermoplastic film can, however, also contain, for example, at least polyurethane, polyethylene, polyethylene terephthalate, polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene tetrafluoroethylene.

The thickness of the thermoplastic film is preferably from 0.2 mm to 2 mm, particularly preferably from 0.3 mm to 1 mm, for example, 0.38 mm or 0.76 mm. This is particularly advantageous with regard to low thickness of the glazing, stable bonding between the outer pane and the functional element, and protection against UV radiation and short wavelength visible light.

In the context of the invention, the term "luminescent material" includes, in particular, luminescent pigments and luminescent dyes. The luminescent material can be implemented, for example, as organic and/or in organic luminescent compounds, ions, aggregates, and/or molecules.

The luminescent material preferably has a local excitation maximum in the range from 350 nm to 450 nm, particularly preferably 380 nm to 420 nm. Radiation in the UV range and in the short wavelength visible range is thus particularly advantageously absorbed.

The luminescent material preferably has a local emission maximum in the range from 410 nm to 600 nm, particularly preferably 430 nm to 500 nm. This is particularly advantageous with regard to a small color change of the light passing through the glazing.

The luminescent material preferably contains one hydroxyalkyl terephthalate with the formula: $R_1$—COO-Ph(OH)$_x$—COO—$R_2$, where $R_1$, $R_2$ is an alkyl or allyl radical having 1 to 10 C atoms, Ph is a phenyl ring, OH is a hydroxyl group bonded to the phenyl ring, and x is a whole number from 1 to 4. The general structural formula is:

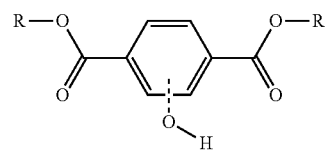

Such luminescent materials have particularly advantageous absorption and emission properties, are permanently stable, and can be readily incorporated into the thermoplastic film.

The luminescent material preferably contains diethyl 2,5-dihydroxy terephtalate. The structural formula is:

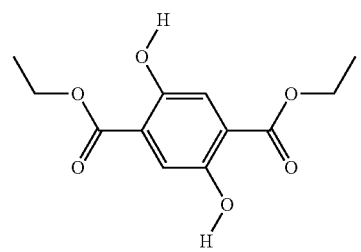 [SMILES: CCOC(=O)c1cc(O)c(C(=O)OCC)cc1O]

Particularly good results are obtained therewith.

The luminescent pigment can, however, also contain benzopyranes, naphthopyranes, 2H-naphthopyranes, 3H-naphthopyranes, 2H-phenanthropyranes, 3H-phenanthropyranes, photochromic resins, coumarins, xanthines, naphthalic acid derivatives, oxazoles, stilbenes, styryls, perylenes, naphthalimides, naphthals, phenyls, xanthenes, lanthanides, preferably Y2O3:Eu, YVO4:Tm, Y2O2S:Pr, Gd2O2S:Tb, and/or mixtures thereof.

The luminescent material is preferably incorporated into the thermoplastic film. The average concentration of the luminescent material in the thermoplastic film is preferably from 0.1 kg/m$^3$ to 20 kg/m$^3$, particularly preferably from 1 kg/m$^3$ to 7 kg/m$^3$. In this range for the concentration of the luminescent material, particularly effective protection of the functional element against aging is obtained.

The luminescent material is preferably distributed homogeneously over the entire area of the thermoplastic film.

The thermoplastic film preferably contains no UV blockers. In the context of the invention, the term "UV blocker" means a material that absorbs radiation in the UV range and/or in the short wavelength visible range and gives off the absorbed radiation energy non-radiatively, in particular by thermal relaxation. A thermoplastic film without UV blockers has the particular advantage of high transmittance in the visible spectral range and a small color change of the light passing through the glazing.

Of course, the glazing according to the invention can also contain more than one thermoplastic film with luminescent material.

In one embodiment of the invention, the switchable functional element is contained in a multilayer film having electrically switchable optical properties. The multilayer film contains the switchable functional element areally between a first and a second carrier film. The multilayer film contains, in the order indicated, at least one carrier film, one flat electrode, one active layer, another flat electrode, and another carrier film. A carrier film is bonded to the outer pane at least via a thermoplastic film, with the thermoplastic film containing at least the luminescent material. The advantage resides in simple production of the glazing. The carrier film advantageously protects the functional element against damage, in particular corrosion.

The carrier films preferably contain at least one thermoplastic polymer, particularly preferably polyethylene terephthalate (PET). This is particularly advantageous with regard to the stability of the multilayer film. The carrier films can, however, also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene tetrafluoroethylene. The thickness of each carrier film is preferably from 0.1 mm to 1 mm, particularly preferably from 0.1 mm to 0.2 mm. The total thickness of the glazing is only insubstantially increased by a carrier film with such a low thickness.

In one embodiment of the invention, the glazing is a composite pane made of the outer pane and an inner pane and the functional element having electrically switchable optical properties arranged areally between the outer pane and the inner pane. The term "inner pane" refers to the pane that faces the interior in the installed position.

When the glazing according to the invention is a composite pane, in one embodiment, the switchable functional element is applied on the interior side surface of the inner pane. The term "interior side surface" refers to that surface of the inner pane that faces the outer pane.

When the glazing according to the invention is a composite pane, in one embodiment, the switchable functional element is provided as a multilayer film having electrically switchable optical properties. The multilayer film contains the switchable functional element areally between a first and a second carrier film. One carrier film is bonded to the outer pane at least via one first thermoplastic film and the other carrier film is bonded to the inner pane via at least one second thermoplastic film. At least the first thermoplastic film contains the luminescent material. The second thermoplastic film can, in principle, likewise contain luminescent material. Preferably, the second thermoplastic film contains no luminescent material. This is advantageous with regard to economical production of the composite pane.

The advantage resides in simple production of the composite pane. The multilayer film having electrically switchable optical properties can, during production, be simply inserted into the composite, which is then laminated to form the composite pane using conventional methods. The functional element is advantageously protected against damage, in particular corrosion, by the carrier films and can be prepared before the production of the composite pane even in relatively large quantities, which can be desirable for economic and technical processing reasons.

The multilayer film having electrically switchable optical properties has, in an advantageous embodiment, an edge sealing. The edge sealing prevents the diffusion of chemical components of the thermoplastic films, for example, plasticizers, into the active layer. Thus, the aging of the switchable functional element is reduced. The edge sealing is implemented, for example, as a polyimide-containing film or foil, which runs circumferentially around the side edges of the multilayer film.

The functional element can, in principle, be any electrically switchable functional element known per se to the person skilled in the art. The invention is, of course, advantageous, in particular in conjunction with those functional elements that age under irradiation with UV radiation and/or radiation in the short wavelength visible range, in particular functional elements that contain organic materials.

In an advantageous embodiment of the invention, the active layer of the functional element is an electrochemically active layer. Such functional elements are known as electrochromic functional elements. The transmittance of visible light depends on the storage level of ions in the active layer, with the ions being provided, for example, by an ion storage layer between an active layer and a flat electrode. The transmittance can be governed by the voltage applied to the flat electrodes, which triggers a migration of the ions. Suitable functional layers contain, for example, at least tungsten oxide or vanadium oxide. Electrochromic functional elements are known, for example, from WO 2012007334 A1, US 20120026573 A1. WO 2010147494 A1, and EP 1862849 A1.

In another advantageous embodiment of the invention, the active layer of the functional element contains liquid crystals, which are, for example, incorporated into a polymeric matrix. Such functional elements are known as PDLC functional elements (polymer dispersed liquid crystal). When no voltage is applied to the flat electrodes, the liquid crystals are oriented in a disorderly fashion, which results in strong scattering of the light passing through the active layer. When a voltage is applied to the flat electrodes, the liquid crystals align themselves in a common direction and the transmittance of light through the active layer is increased. Such a functional element is known, for example, from DE 102008026339 A1.

In another advantageous embodiment of the invention, the functional element is an electroluminescent functional element. The active layer contains electroluminescent materials, which can be inorganic or organic (OLEDs). The luminescence of the active layer is excited by application of a voltage to the flat electrodes. Such functional elements are known, for example, from US 2004227462 A1 and WO 2010112789 A2.

In another advantageous embodiment of the invention, the active layer of the functional element contains suspended particles, with the absorption of light by the active layer variable through the application of a voltage to the flat electrodes. Such functional elements are known as SPD functional elements (suspended particle device), for example, from EP 0876608 B1 and WO 2011033313 A1.

The functional element can, of course, have, besides the active layer and the flat electrodes, other layers known per se, for example, barrier layers, blocker layers, antireflection layers, protection layers, and/or smoothing layers.

The area of the functional element can correspond to the area of the glazing. In that case, advantageous uniform darkening of the glazing can be obtained by means of the switchable functional element. The glazing can, alternatively, also have a circumferential edge region with a width of, for example, 2 mm to 20 mm, which is not provided with the functional element, in particular when this edge region is concealed by fastening elements, frames, or prints. In particular, when the glazing is implemented as a composite pane, the switchable functional element is advantageously protected against corrosion in the interior of the intermediate layer.

The inner and/or the outer flat electrode are preferably designed as transparent, electrically conductive layers. The flat electrodes preferably contain at least a metal, a metal alloy, or a transparent conducting oxide (TCO). The flat electrodes can contain, for example, silver, gold, copper, nickel, chromium, tungsten, indium tin oxide (ITO), gallium-doped or aluminum-doped zinc oxide, and/or fluorinedoped or antimony-doped tin oxide. The flat electrodes preferably have a thickness from 10 nm to 2 μm, particularly preferably from 20 nm to 1 μm, most particularly preferably from 30 nm to 500 nm.

The outer pane and/or, optionally, the inner pane preferably contain non-prestressed, partially prestressed, or prestressed glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The outer pane and/or the inner pane can be clear and transparent and have, for example, transmittance in the visible spectral range of at least 70%, preferably at least 85%. The outer pane and/or the inner pane can, however, also be tinted or colored and have, for example, transmittance in the visible spectral range from 20% to 70%.

The thickness of the outer pane and, optionally, of the inner pane can vary widely and thus be adapted to the requirements in the individual case. The outer pane and/or the inner pane preferably have thicknesses from 0.5 mm to 15 mm, particularly preferably from 1 mm to 5 mm, and most particularly preferably from 1.5 mm to 3 mm, for example, 1.6 mm, 1.8 mm, or 2.1 mm.

The surface area of the glazing according to the invention can vary widely, for example, from 100 $cm^2$ to 20 $m^2$. Preferably, the glazing has a surface area from 400 $cm^2$ to 6 $m^2$, as customary for glazings of motor vehicles and of structural and architectural glazings. The glazing can have any three-dimensional shape. The glazing is preferably flat or slightly or greatly curved in one or a plurality of spatial directions.

In an advantageous embodiment of the invention, a barrier film is arranged on the surface of the thermoplastic film with the luminescent material facing away from the outer pane. The barrier film advantageously prevents diffusion of the luminescent material into other films of the glazing. The barrier film preferably contains at least one polymer, which, at the temperatures occurring during production and processing of the glazing, does not become sufficiently soft to enable diffusion of the luminescent material. The barrier film can contain, for example, at least PET.

In an advantageous embodiment, an infrared protection layer is arranged between the switchable functional element and the outer pane. Thus, the functional element is protected against infrared radiation components of sunlight, which can cause aging. The infrared protection layer can be applied, for example, as a coating on the outer pane or on a polymeric film.

The outer pane, the inner pane, and/or the films of the intermediate layer can have other suitable coatings, known per se, for example, antireflection coatings, nonstick coatings, scratch resistant coatings, photocatalytic coatings, or thermal radiation reflecting coatings (low-E coatings).

The transmittance of the thermoplastic film according to the invention with the luminescent material in the wavelength range from 380 nm to 410 nm is preferably less than or equal to 10%.

The pane according to the invention preferably has a TUV [ultraviolet transmittance] value according to ISO 13837 (AM 1.5) less than or equal to 1%.

The object of the invention is further accomplished by a method for producing a glazing having electrically switchable optical properties, wherein at least a) at least a luminescent material is applied on or incorporated into a thermoplastic film, b) at least an outer pane, the thermoplastic film, and a switchable functional element are arranged one over another areally in this order, and c) the functional element is bonded to the outer pane via the thermoplastic film.

In process step (a), the luminescent material can be applied with a solvent on the thermoplastic film, for example, by spraying, screen printing, offset printing, ink jet printing, and/or flexographic printing. The solvent preferably contains alcohols, ketones, esters, amines, amides, and/or mixtures thereof. The solvent particularly preferably contains ethanol, tetrahydrofuran, and/or benzyl alcohol. Most of the solvent is lost by evaporation after the application of the luminescent material. The amount of the luminescent material applied is determined by the thickness of the thermoplastic film. Preferably, 0.1 $g/m^2$ to 15 $g/m^2$ of the luminescent material is applied on the thermoplastic film when the thermoplastic film has a thickness of 0.76 mm, particularly preferably from 1 $g/m^2$ to 5 $g/m^2$. At the time of the lamination of the thermoplastic film between the outer pane and the inner pane, the luminescent material is distributed preferably uniformly in the thermoplastic film. The lamination is preferably done at temperatures from 120° C. to 170° C., a pressure from 10 bar to 15 bar, and for a period of 30 min to 240 min.

However, the luminescent material can already be blended with the thermoplastic starting material before the production of the thermoplastic film. The luminescent material is then extruded together with the thermoplastic starting material to form the thermoplastic film according to the invention and incorporated into the thermoplastic film in this manner.

In process step (b), the functional element can be applied, for example, on an inner pane. At least the inner pane, the thermoplastic film, and the outer pane are then arranged areally one over another in the order indicated, with the surface of the inner pane provided with the functional element facing the thermoplastic film.

Alternatively, the functional element can be provided, for example, as a multilayer film having electrically switchable optical properties, with the actual functional element arranged between a first and a second carrier film. The thermoplastic film can be placed on the outer pane; and the multilayer film can be placed on the thermoplastic film. If a composite pane is to be produced, at least the outer pane, a first thermoplastic film, the multilayer film having electrically switchable optical properties, a second thermoplastic film, and an inner pane are arranged one over another in the order indicated. According to the invention, the first thermoplastic film contains the luminescent material. The second thermoplastic film can contain a luminescent material or not.

The electrical contacting of the flat electrodes of the switchable functional element is preferably done before the bonding of the outer pane and the functional element to form the glazing according to the invention.

Process step (c) is preferably done under the action of heat, vacuum, and/or pressure. Methods known per se can be used for the lamination, for example, autoclaving methods, vacuum bag methods, vacuum ring methods, calendering methods, vacuum laminators, or combinations thereof.

The pane according to the invention is preferably used in buildings, in particular in the entrance area or window area or in means of transportation for travel on land, in the air, or on water, in particular in trains, ships, and motor vehicles, for example, as a rear window, side window, and/or roof panel.

The pane according to the invention can be connected to another pane to form an insulating glazing unit.

The invention also includes the use of a thermoplastic film that contains at least one luminescent material in a glazing having electrically switchable optical properties for the protection of a switchable functional element against UV radiation and radiation in the short wavelength visible range, in particular in the wavelength range from 380 nm to 410 nm.

Figure 2:
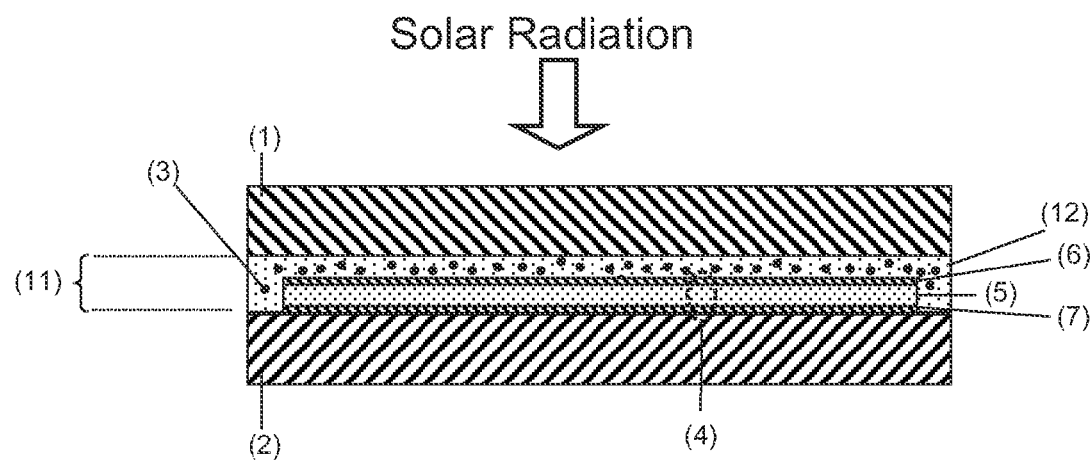
Figure 3:
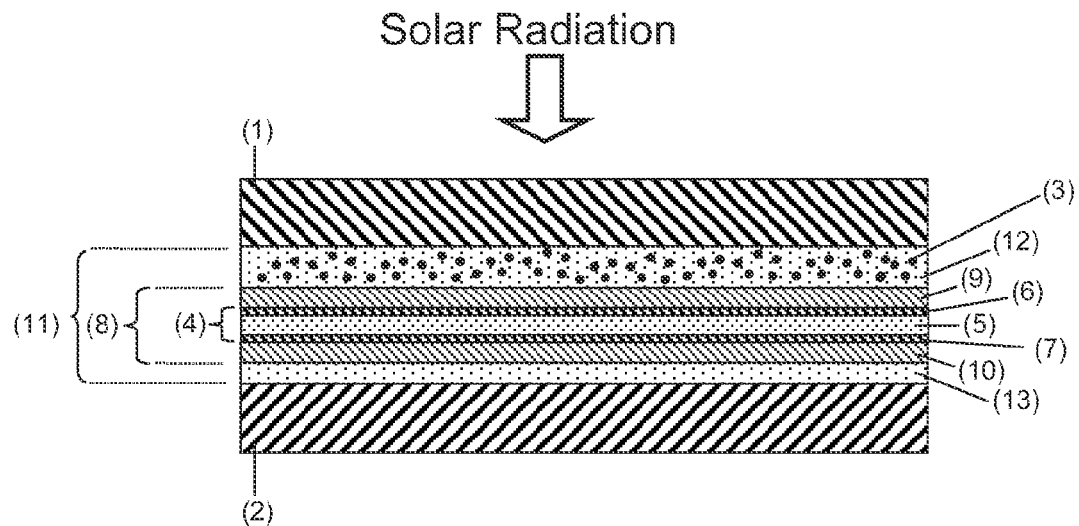

The invention is explained in detail with reference to drawings and exemplary embodiments. The drawings are schematic representations and are not true to scale. The drawings in no way restrict the invention. They depict:

FIG. 1 a cross-section through a first embodiment of the glazing according to the invention having electrically switchable optical properties, FIG. 2 a cross-section through another embodiment of the glazing according to the invention, FIG. 3 a cross-section through another embodiment of the glazing according to the invention.

Figure 4:
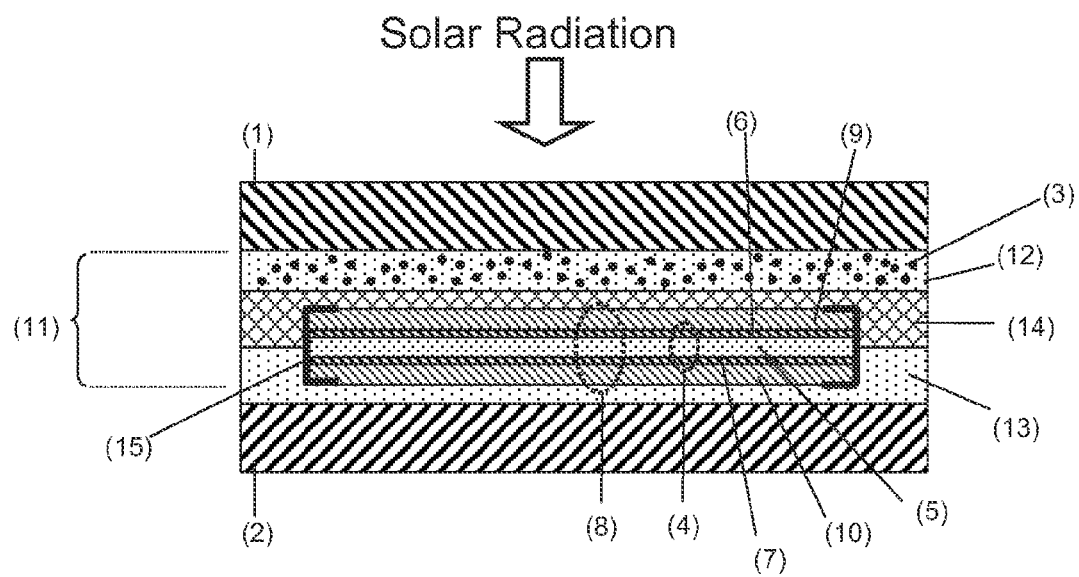
Figure 5:
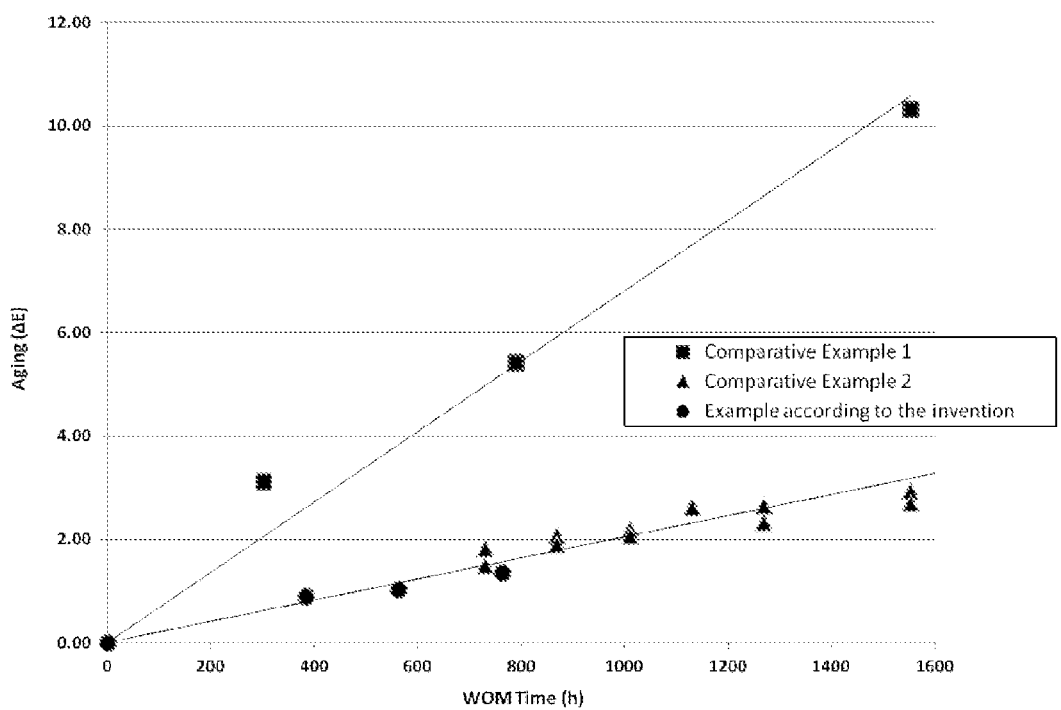
Figure 6:
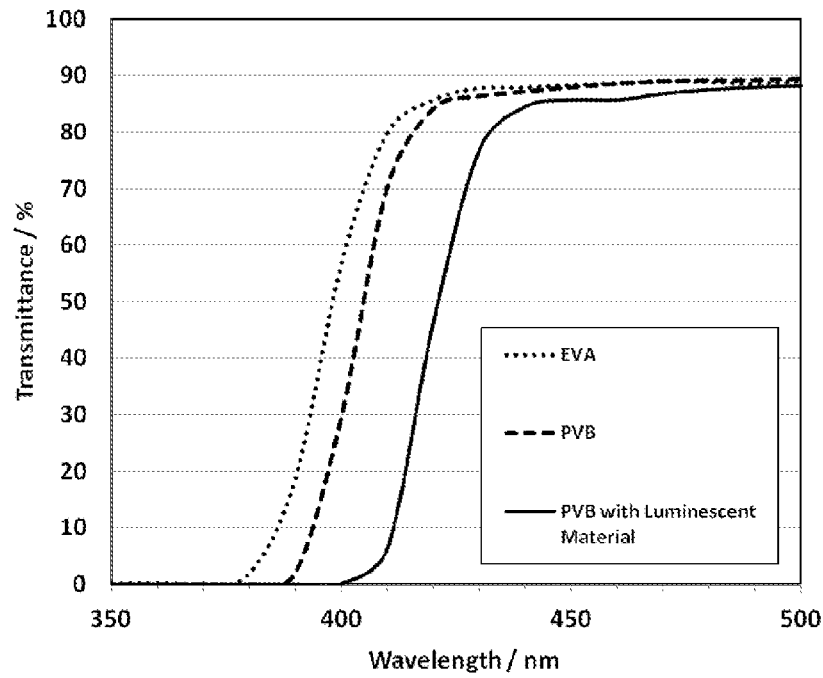
Figure 7:
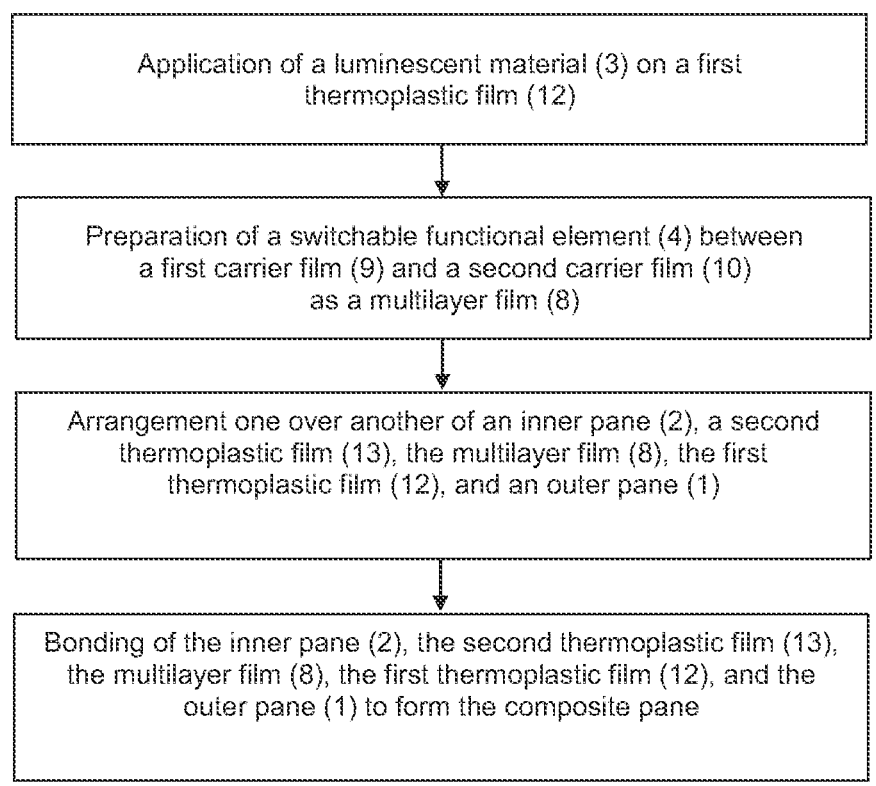

FIG. 4 a cross-section through another embodiment of the glazing according to the invention, FIG. 5 the aging of switchable functional elements without and with protection against UV radiation and short wavelength radiation of the visible range referring to a diagram, FIG. 6 the transmittance of thermoplastic films of the prior art and according to the invention referring to a diagram, and FIG. 7 an exemplary embodiment of the method according to the invention referring to a flowchart.

FIG. 1 depicts a cross-section through an embodiment of the glazing according to the invention having electrically switchable optical properties. The glazing includes one outer pane 1 and is intended as a window glazing, for example, a shop window. The outer pane is made of soda lime glass.

The glazing further includes a switchable functional element 4. The functional element 4 contains an active layer 5 between an outer flat electrode 6 and an inner flat electrode 7. The flat electrodes 6, 7 are connected to an external power supply via busbars (not shown) and connection cables (not shown). The functional element 4 was provided at the time of production of the composite pane as a multilayer film 8 having electrically switchable optical properties. The multilayer film 8 includes the functional element 4 between a first carrier film 9 and a second carrier film 10. The carrier films 9, 10 are made of polyethylene terephthalate (PET) and have a thickness of 0.125 mm. The functional element is, for example, an electrochromic functional element or an SPD functional element.

The first carrier film 9 is bonded to the outer pane via a thermoplastic film 12 made of polyvinyl butyral (PVB). The functional element 4 is arranged on the interior side of the outer pane 1. This means that, in the installed position, the outer pane 1 faces the external environment and the multilayer film 8 faces the building interior. A luminescent material 3 with a concentration of roughly 3.9 kg/m³ is incorporated into the thermoplastic film 12. The luminescent material 3 is diethyl-2,5-dihydroxy terephthalate.

FIG. 2 depicts a cross-section through an embodiment of the glazing according to the invention having electrically switchable optical properties. The glazing is a composite pane. The composite pane includes a outer pane 1, which is bonded to an inner pane 2 via an intermediate layer 11. The composite pane is provided as a component of a window glazing of a building and is arranged, in the installed position, such that the outer pane 1 faces the external environment and the inner pane 2 faces the building interior. The outer pane 1 and the inner pane 2 are made of soda lime glass and have thicknesses of, for example, 1.6 mm.

A switchable functional element 4 is incorporated into the intermediate layer 11. The functional element 4 is, for example, a PDLC functional element with an active layer 5 between an outer flat electrode 6 and an inner flat electrode 7. Alternatively, the functional element 4 can be, for example, an SPD functional element. The functional element 4 is arranged on the surface of the inner pane 2 facing the outer pane 1, with a circumferential edge region of the inner pane 2 not provided with the functional element 4. The flat electrodes 6, 7 are connected to an external power supply via busbars (not shown) and connection cables (not shown). The flat electrodes 6, 7 are made of indium tin oxide (ITO) and have a thickness of roughly 100 nm. The active layer 5 contains liquid crystals that are incorporated into a polymer matrix. When a voltage is applied on the flat electrodes 6, 7, the liquid crystals align themselves in a common direction and the scattering of light on the liquid crystals is reduced. The optical properties of the active layer 5 are, consequently, electrically switchable.

The intermediate layer 11 is formed by a thermoplastic film 12. The thermoplastic film 12 is made of polyvinyl butyral (PVB) into which a luminescent material 3 is incorporated. The thermoplastic film 12 has a thickness of, for example, 0.76 mm. The luminescent material 3 is diethyl-2,5-dihydroxy terephthalate. The luminescent material 3 has, in the thermoplastic film 12, a concentration of roughly 3.9 kg/m³.

In the edge region not provided with the functional element 4, the inner pane 2 is bonded directly to the outer pane 1 via the thermoplastic film 12. The functional element is thus advantageously protected against corrosion in the interior of the intermediate layer 11.

FIG. 3 depicts a cross-section through another embodiment of the glazing according to the invention having electrically switchable optical properties. The glazing is a composite pane. The composite pane comprises an outer pane 1 that is bonded via an intermediate layer 11 to an inner pane 2. The composite pane is provided as a roof panel of a motor vehicle and is arranged in the installed installation such that the outer pane 1 faces the external environment and the inner pane 2 faces the vehicle interior. The outer pane 1 and the inner pane 2 are made of soda lime glass and have thicknesses of 2.1 mm.

A switchable functional element 4 is incorporated into the intermediate layer 11. The functional element 4 is an SPD functional element with an active layer 5 between an outer flat electrode 6 and an inner flat electrode 7. The flat electrodes 6, 7 are connected to an external power supply via busbars (not shown) and connection cables (not shown). The flat electrodes 6, 7 are made of indium tin oxide (ITO) and have a thickness of, for example, roughly 50 nm. The active layer 5 contains polarized particles suspended in a resin. As a function of the voltage applied on the flat electrodes 6, 7, the suspended particles align themselves along a common spatial direction. By means of the alignment of the particles, the absorption of visible light is reduced. The transmittance of visible light through the composite pane can, consequently, be conveniently controlled electrically.

The functional element 4 was provided, at the time of production of the composite pane, as a multilayer film 8 having electrically switchable optical properties. The multilayer film 8 includes the functional element 4 between a first carrier film 9 and a second carrier film 10. The carrier films 9, 10 are made of polyethylene terephthalate (PET) and have a thickness of 0.125 mm.

The multilayer film 8 is bonded via a first thermoplastic film 12 to the outer pane 1 and via a second thermoplastic film 13 to the inner pane 2. The first thermoplastic film 12 is made of polyvinyl butyral (PVB) and has a thickness of 0.76 mm. The second thermoplastic film 13 is made of ethylene vinyl acetate (EVA) and has a thickness of 0.38 mm. The intermediate layer 11 thus comprises the first thermoplastic film 12, the multilayer film 8 (with the first carrier film 9, the outer flat electrode 6, the active layer 5, the inner flat electrode 9, and the second carrier film 10), and the second thermoplastic film 13.

A luminescent material 3 is incorporated into the first thermoplastic film 12. The thermoplastic film 12 has a thickness of, for example, 0.76 mm. The luminescent material 3 is diethyl-2,5-dihydroxy terephtalate. The luminescent material 3 has, in the thermoplastic film 12, a concentration of roughly 3.9 kg/m$^3$. By means of the luminescent material 3, the transmittance of the thermoplastic film 12 in the wavelength range from 380 nm to 410 nm is less than 10%.

Radiation components of the sunlight passing through the composite pane in the UV range and in the short wavelength visible range, in particular radiation components with wavelengths less than roughly 410 nm are absorbed by the thermoplastic film 12. Consequently, these radiation components cannot lead to aging of the functional element 4, by which means the long-term stability of the functional element 4 is advantageously increased. The radiation energy absorbed by the luminescent material 3 is emitted again with a greater wavelength. Compared to the use of prior art UV blockers, this reduces the color change of the light passing through the composite pane and increases the transmittance of the composite pane. The fact that improved protection of the functional element 4 against aging is provided by the thermoplastic film 12 with the luminescent material was unexpected and surprising for the person skilled in the art.

FIG. 4 depicts a cross-section through another embodiment of the glazing according to the invention having electrically switchable optical properties. The glazing is a composite pane. The outer pane 1, the inner pane 2, the first thermoplastic film 12, the second thermoplastic film 13, and the multilayer film 8 are configured as in FIG. 3. The multilayer film 8 has a smaller surface area than the outer pane 1 and the inner pane 2, with a circumferential edge region of the composite pane not provided with the multilayer film 8 when looked through. Thus, the multilayer film 8 does not extend to the side edges of the composite pane. Consequently, the multilayer film 8 has no contact with the surrounding atmosphere and is advantageously protected against corrosion in the region of the side edges by the films of the intermediate layer 11. The multilayer film 8 is also provided with a circumferential edge sealing 15. The edge sealing 15 is implemented as polyimide film, which runs circumferentially around the side edges of the multilayer film 8 and extends, starting from the side edges, a few millimeters beyond the surfaces of the carrier films 9, 10 facing away from the active layer 5. The edge sealing prevents the diffusion of plasticizers and other adhesive components of the thermoplastic films 12, 13 into the active layer 5, by which means the aging of the functional element 4 is reduced.

A barrier film 14 is arranged between the first thermoplastic film 12 with the luminescent material 3 and the multilayer film 8. The barrier film 14 is made of PET and prevents diffusion of the luminescent material 3 out of the first thermoplastic film 12 into the second thermoplastic film 13. The barrier film 14 is also provided with an infrared protection coating (not shown). This protects the functional element 4 against aging due to infrared components of sunlight.

FIG. 5 shows a diagram of aging measurements on composite panes having electrically switchable optical properties. The composite panes were subjected to a standardized Weather-Ometer (WOM) Test. The composite panes were irradiated with a xenon arc lamp whose radiation simulates the solar spectrum. The outer pane 1 was arranged facing the light source. After the irradiation, the value ΔE was determined. The value ΔE indicates the changes in brightness and color of the composite pane, in particular of the functional element 4 as a result of the WOM Test. The value ΔE is thus a measure of the aging of the functional element 4. It is calculated with the following formula:

$$\Delta E = \sqrt{\left(\frac{\Delta L^*}{2}\right)^2 + \Delta a^{*2} + \Delta b^{*2}}$$

L* is the brightness value, a* and b* are the color coordinates in the L*a*b* Color Space. Δ refers to the difference in the respective variable before and after the WOM Test.

The values ΔE were determined for an example according to the invention and two comparative examples and are plotted in FIG. 5 as a function of the irradiation period. The Example according to the invention was a composite pane in accordance with FIG. 3. The luminescent material 3 was incorporated into the first thermoplastic film 12. The Comparative Example 1 differed from the Example through the first thermoplastic film 12. The thermoplastic film 12 in the Comparative Example 1 was made of ethylene vinyl acetate (EVA), had a thickness of 0.38 mm, and contained no luminescent material 3. The composite pane in the Comparative Example 2 was configured exactly like that in the Comparative Example 1. However, during the irradiation in the Comparative Example 2, an optical filter that was not transparent to UV radiation or to radiation in the visible range with a wavelength of less than 500 nm was arranged between the radiation source and the composite pane.

From FIG. 5, it is evident that the protection of the composite pane against UV radiation and radiation in the short wavelength visible range results in significantly less aging of the functional element 4. The values ΔE in the Comparative Example 2 are significantly lower for all observation times than in the Comparative Example. The values ΔE in the Example according to the invention are approximately on the same best-fit straight line as the values ΔE of the Comparative Example 2. Thus, by means of the thermoplastic film according to the invention 12 with the luminescent material 3, equally effective protection against UV radiation and radiation in the short wavelength range is obtained as with an optical filter. This result was unexpected and surprising for the person skilled in the art.

FIG. 6 shows the transmittance of a thermoplastic film made of EVA, of a thermoplastic film made of PVB, and of a thermoplastic film 12 according to the invention with luminescent material 3 incorporated. The thermoplastic film according to the invention 12 is made of PVB and contains diethyl-2,5-dihydroxy terephtalate as the luminescent material 3 at a concentration of roughly 3.9 kg/m$^3$. Each thermoplastic film has transmittance of roughly 0% for UV radiation up to a certain wavelength. However, as the wavelength increases, the transmittance of the thermoplastic film increases up to a maximum value of roughly 90%. If the thermoplastic film is arranged between the outer pane 1 and the switchable functional element 4 of a glazing having electrically switchable optical properties, the transmitted UV radiation as well as radiation in the short wavelength visible range results in aging of the functional element 4. It is evident from the diagram that a film made of PVB transmits a smaller range of the UV spectrum than a film made of EVA. When a luminescent material is incorporated into the film, the radiation component transmitted in the UV range and in the short wavelength visible range is further reduced. Table 1 summarizes the transmittance of the films at 380 nm, 390 nm, 400 nm, and 410 nm. Through the use of the PVB film with luminescent material as the thermoplastic film 12 of a glazing having electrically switchable optical properties, the aging of the switchable functional element 4 can be effectively reduced (cf. FIG. 5). This result was unexpected and surprising for the person skilled in the art.

TABLE 1

| λ | EVA | PVB | PVB with Diethyl-2,5-dihydroxy terephtalate (3.9 kg/m$^3$) |
|---|---|---|---|
| 380 nm | 1.9% | 0.0% | 0.0% |
| 390 nm | 18.6% | 2.0% | 0.0% |
| 400 nm | 56.6% | 29.5% | 0.2% |
| 410 nm | 79.7% | 70.3% | 6.5% |

FIG. 7 depicts an exemplary embodiment of the method according to the invention for producing a glazing having electrically switchable optical properties. The exemplary embodiment results in a composite pane in accordance with FIG. 3. First, the luminescent material 3 is applied in a solvent on a surface of the first thermoplastic film 12. The concentration of the luminescent material 3 on the thermoplastic film 12 is, for example, 3 g/m$^2$. The second thermoplastic film 13 is placed on the inner pane 2. The multilayer film 8 is electrically contacted and placed on the second thermoplastic film 13. The first thermoplastic film 12 is placed on the multilayer film 8. The outer pane 1 is placed on the first thermoplastic film 12. Then, the stack is laminated under the action of temperature, pressure, and/or vacuum to form the composite pane.

LIST OF REFERENCE CHARACTERS (1) outer pane
(2) inner pane
(3) luminescent material
(4) functional element having electrically switchable optical properties
(5) active layer of the functional element 4
(6) outer flat electrode of the functional element 4
(7) inner flat electrode of the functional element 4
(8) multilayer film having electrically switchable optical properties
(9) carrier film of the multilayer film 8
(10) carrier film of the multilayer film 8
(11) intermediate layer
(12) thermoplastic film
(13) thermoplastic film
(14) barrier film
(15) edge sealing

The invention claimed is:

1. A glazing having electrically adjustable optical properties, comprising:
   an outer pane; and
   an optically adjustable element that is areally bonded to the outer pane via at least one thermoplastic film,
      wherein the at least one thermoplastic film contains at least one luminescent material, the at least one thermoplastic film containing from 0.1 kg/m$^3$ to 20 kg/m$^3$ of the at least one luminescent material.

2. The glazing according to claim 1, wherein the at least one thermoplastic film contains no UV blockers.

3. The glazing according to claim 1, wherein the optically adjustable element contains at least one organic material.

4. The glazing according to claim 1, wherein the optically adjustable element is areally arranged between two carrier films and wherein one of the carrier films is bonded to the outer pane via the at least one thermoplastic film.

5. The glazing according to claim 1, wherein a barrier film is arranged on a surface of the at least one thermoplastic film facing away from the outer pane.

6. The glazing according to claim 5, wherein the barrier film contains polyethylene terephthalate (PET).

7. The glazing according to claim 1, wherein the thermoplastic film contains one or both of ethylene vinyl acetate (EVA) and polyvinyl butyral (PVB).

8. The glazing according to claim 1, wherein the luminescent material has an excitation maximum in the range from 350 nm to 450 nm.

9. The glazing according to claim 1, wherein the luminescent material has an emission maximum in the range from 410 nm to 600 nm.

10. The glazing according to claim 1, wherein the at least one luminescent material contains at least one hydroxyalkyl terephthalate with the formula R1-COO-Ph(OH)$x$—COO—R2, where R1, R2 is an alkyl or allyl radical having 1 to 10 C atoms,
   Ph is a phenyl ring,
   OH is a hydroxyl group bonded to the phenyl ring, and
   $x$ is an integer from 1 to 4.

11. The glazing according to claim 1, wherein the at least one thermoplastic film has transmittance less than or equal to 10% in the wavelength range from 380 nm to 410 nm.

12. The glazing according to claim 1, wherein an active layer of the optically adjustable element selected from the group consisting of a suspended particle device, a polymer dispersed liquid crystal, an electrochromic material, and an electroluminescent material.

13. The glazing according to claim 1, further comprising an inner pane forming a composite pane, wherein the optically adjustable element is arranged areally between the outer pane and the inner pane.

14. The glazing according to claim 1, further including a barrier film positioned between the at least one thermoplastic film and the optically adjustable element.

15. The glazing according to claim 1, wherein the at least one thermoplastic film has a thickness from 0.2 mm to 2 mm.

16. The glazing according to claim 1, wherein the at least one luminescent material is contained within the at least one thermoplastic film.

17. The glazing according to claim 1, wherein the at least one luminescent material is distributed homogeneously over an entire area of the at least one thermoplastic film.

18. The glazing according to claim 1, wherein the at least one luminescent material has an excitation maximum in the range from 380 nm to 420 nm.

19. The glazing according to claim 1, wherein the at least one luminescent material has an emission maximum in the range from 430 nm to 500 nm.

20. The glazing according to claim 1, wherein the at least one luminescent material contains diethyl 2,5-dihydroxy terephthalate.

21. The glazing according to claim 1, wherein the at least one thermoplastic film contains from 1 kg/m$^3$ to 7 kg/m$^3$ of the at least one luminescent material.

22. The glazing according to claim 1, wherein the at least one thermoplastic film contains a material selected from the group consisting of ethylene vinyl acetate, polyvinyl butyral, polyurethane, polyethylene, polyethylene terephthalate, polypropylene, polycarbonate, polymethyl methacrylate, polyacrylate, polyvinyl chloride, polyacetate resin, casting resins, acrylates, fluorinated ethylene propylenes, polyvinyl fluoride, and ethylene tetrafluoroethylene.

23. A method for producing a glazing having electrically adjustable optical properties, comprising:
providing a thermoplastic film;
applying at least one luminescent material on the thermoplastic film or incorporating at least one luminescent material into the thermoplastic film, the at least one thermoplastic film containing from 0.1 kg/m$^3$ to 20 kg/m$^3$ of the at least one luminescent material;
arranging the thermoplastic film between an outer pane and an optically adjustable element; and
bonding the optically adjustable element to the outer pane via the thermoplastic film.

24. A protection method for a glazing, comprising:
providing an optically adjustable element; and
areally bonding the optically adjustable element to an outer pane via a thermoplastic film, wherein the thermoplastic film contains at least one luminescent material, the at least one thermoplastic film containing from 0.1 kg/m$^3$ to 20 kg/m$^3$ of the at least one luminescent material, thus protecting the optically adjustable element against UV radiation and radiation in the short wavelength visible range.

25. The method of claim 24, wherein protecting the optically adjustable element includes protection against radiation having a wavelength less than 410 nm.

26. The method of claim 24, wherein protecting the optically adjustable element includes protection against radiation in the wavelength range from 380 nm to 410 nm.

* * * * *